United States Patent [19]

Rosen

[11] Patent Number: 4,722,183
[45] Date of Patent: Feb. 2, 1988

[54] METHOD FOR CONTROLLING THE UTILIZATION OF FLUID BIPROPELLANT IN A SPACECRAFT ROCKET ENGINE

[75] Inventor: Harold A. Rosen, Santa Monica, Calif.

[73] Assignee: Hughes Aircraft Company, Los Angeles, Calif.

[21] Appl. No.: 54,134

[22] Filed: May 11, 1987

Related U.S. Application Data

[63] Continuation of Ser. No. 782,746, Oct. 1, 1985, abandoned.

[51] Int. Cl.$^4$ .............................................. A02K 9/50
[52] U.S. Cl. ....................................... 60/204; 60/240; 60/259
[58] Field of Search ...................... 60/39.27, 204, 240, 60/243, 257, 259; 137/101.25

[56] References Cited

U.S. PATENT DOCUMENTS

| | | | |
|---|---|---|---|
| 2,849,015 | 8/1958 | Colson | 132/98 |
| 2,860,651 | 11/1958 | Davies | 137/98 |
| 2,860,652 | 11/1958 | Badger | 137/98 |
| 3,058,043 | 10/1962 | Schroeder | 137/101.25 |
| 3,058,303 | 10/1962 | Mulready . | |
| 3,073,110 | 1/1963 | Dillaway | 137/101.25 |
| 3,080,876 | 3/1963 | Adamson . | |
| 3,095,740 | 7/1963 | Peacock | 60/240 |
| 3,114,381 | 12/1963 | Klose | 137/101.25 |
| 3,172,254 | 3/1965 | Wright . | |
| 3,745,338 | 7/1973 | Joyce . | |
| 4,541,238 | 9/1985 | Scheller | 60/240 |

FOREIGN PATENT DOCUMENTS 0091852 10/1983 European Pat. Off. .

Primary Examiner—Louis J. Casaregola
Attorney, Agent, or Firm—S. M. Mitchell; M. J. Meltzer; A. W. Karambelas

[57] ABSTRACT

A method is provided for controlling the utilization of a fluid bipropellant including two respective constituents separately in respective tanks aboard a spacecraft for consumption by a spacecraft rocket engine, comprising the steps of actuating the rocket engine; during the actuation of the rocket engine, providing a flow of bipropellant constituents to the rocket engine in a first proportion; after the actuation of the rocket engine, measuring the amount of at least one bipropellant constituent in a bipropellant tank containing the constituent; adjusting a pressure level within at least one bipropellant tank relative to a pressure level within another bipropellant tank based upon the amount of said at least one bipropellant constituent in a bipropellant tank containing said at least one constituent; after the measuring step, actuating the rocket engine; during the actuation of the rocket engine after the measuring step, providing a flow of bipropellant constituents to the rocket engine in a second proportion based upon said adjusted pressure level within said at least one bipropellant tank relative to a pressure level within said another bipropellant tank.

5 Claims, 8 Drawing Figures

METHOD FOR CONTROLLING THE UTILIZATION OF FLUID BIPROPELLANT IN A SPACECRAFT ROCKET ENGINE

This is a continuation of copending application Ser. No. 782,746, filed Oct. 1, 1985 now abandoned.

BACKGROUND OF THE INVENTION

1. Field of the Invention

The present invention relates to spacecraft rocket propulsion systems and, more particularly, to the utilization of fluid bipropellant by spacecraft rocket propulsion systems.

2. Description of the Related Art

A recurrent objective in the implementation of spacecraft rocket propulsion systems powered by a fluid bipropellant is the efficient utilization of the bipropellant. Surplus bipropellant which remains after a rocket engine has boosted a spacecraft to a desired trajectory above the earth represents excess mass carried aloft with the spacecraft. This excess mass can add to the cost of launching a spacecraft and can degrade spacecraft performance by, for example, adding to the total spacecraft mass which must be moved during station keeping maneuvers when a spacecraft is in geostationary orbit.

Unfortunately, the relative rates at which the respective constituents of a bipropellant are consumed is not easily predictable. Thus, enough of each bipropellant constituent typically is provided so that the spacecraft will not run short of one or the other bipropellant constituent before reaching the desired trajectory even if one constituent is consumed more rapidly than origianlly predicted. When the spacecraft does not consume the extra bipropellant, however, a surplus results.

In the past, various techniques have been employed in order to more efficiently utilize the bipropellant in order to avoid such surpluses. For example, during the firing of a rocket engine, the rate of consumption of each bipropellant constituent has been measured, and its flow rate to the rocket engine has been adjusted accordingly in order to achieve more complete consumption of both bipropellant constituents. Furthermore, in the case of some spacecraft of the type which have had large numbers of launchings, sufficient data on their rocket engine in-flight performance has been compiled to provide a relatively accurate estimate of how much of each bipropellant constituent is needed for a given mission.

While earlier techniques for efficiently utilizing fluid bipropellant generally have been successful, there have been shortcomings with their use. For example, the measurement and adjustment of a bipropellant constituent's flow rate during the firing of a rocket engine often cannot be performed with sufficient accuracy. Furthermore, when a type of spacecraft has not had the benefit of numerous launchings in which to compile bipropellant consumption rate statistics, there may be insufficient data to accurately predict the rates of consumption of the bipropellant constituents during a particular mission.

Thus, there has been a need for a method for more efficiently controlling the utilization of fluid bipropellant by a spacecraft. The present invention meets this need.

SUMMARY OF THE INVENTION

In one implementation, the present invention comprises a method for controlling the utilization of a fluid bipropellant including two respective constituents, for example, an oxidizer and a fuel, which are contained separately in respective tanks aboard a spacecraft and which are consumed by a spacecraft rocket engine. The method comprises the step of actuating the rocket engine. During the actuation of the rocket engine, the bipropellant constituents flow to the rocket engine in a first proportion. After the actuation of the rocket engine, the amount of bipropellant constituents contained in the bipropellant tanks is measured. The pressure level within bipropellant tank is adjusted based upon the amount of bipropellant constituents measured in the bipropellant tanks. After the measuring step, the rocket engine is fired once again. During this subsequent actuation of the rocket engine, the bipropellant constituents flow to the rocket engine in a second proportion based upon the above-described adjusted pressure level.

Thus, the present invention provides a method for efficiently utilizing bipropellant in a spacecraft rocket engine by advantageously measuring the amount of bipropellant constituents remaining within the bipropellant tanks between the firings of the rocket engine. In this manner, a relatively accurate measurement of the remaining constituents can be made and appropriate adjustment to the constituent flow rate during a subsequent firing of the rocket engine can be made so that both constituents of the bipropellant are more completely utilized by the rocket engine.

These and other features and advantages of the present invention will become more apparent from the following detailed description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the accompanying drawings in which.

DESCRIPTION OF THE PREFERRED EMBODIMENTS

The present invention comprises a novel method for controlling the utilization of a fluid bipropellant in a spacecraft rocket engine. The following description is presented to enable any person skilled in the art to make and use the invention, and is provided in the context of a particular application and its requirements. Various modifications to the preferred method will be readily apparent to those skilled in the art, and the generic principles defined herein may be applied to other methods and applications without departing from the spirit and scope of the invention. Thus, the present invention is not intended to be limited to the methods shown, but is to be accorded the widest scope consistent with the principles and features dislcosed herein.

Figure 1:
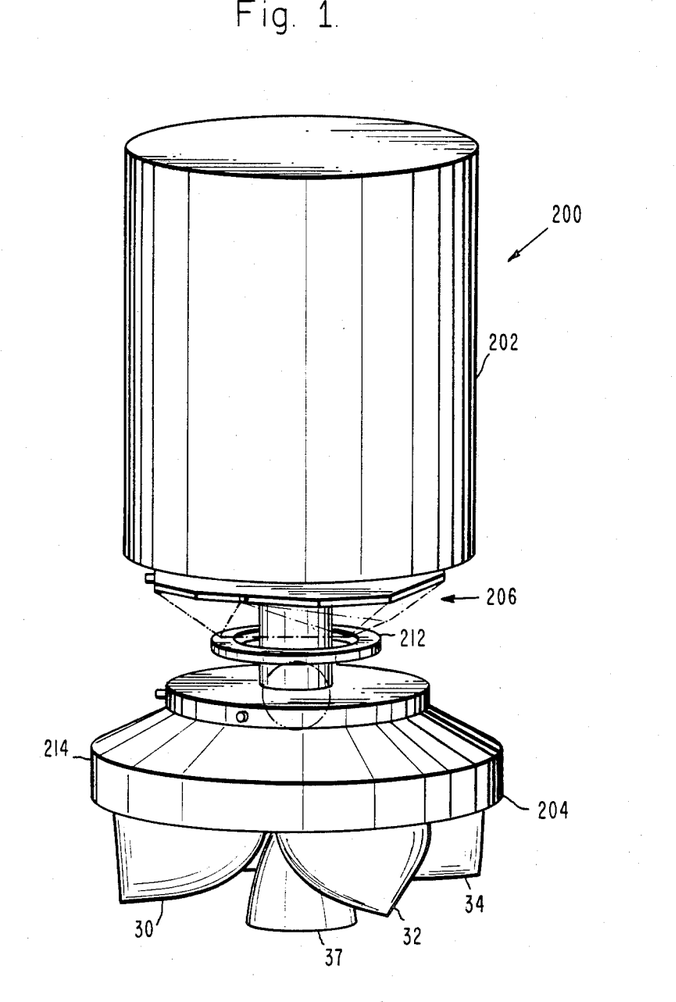
FIG. 1 is an elevation view, partially exploded, of the spacecraft in accordance with the invention.
Figure 2:
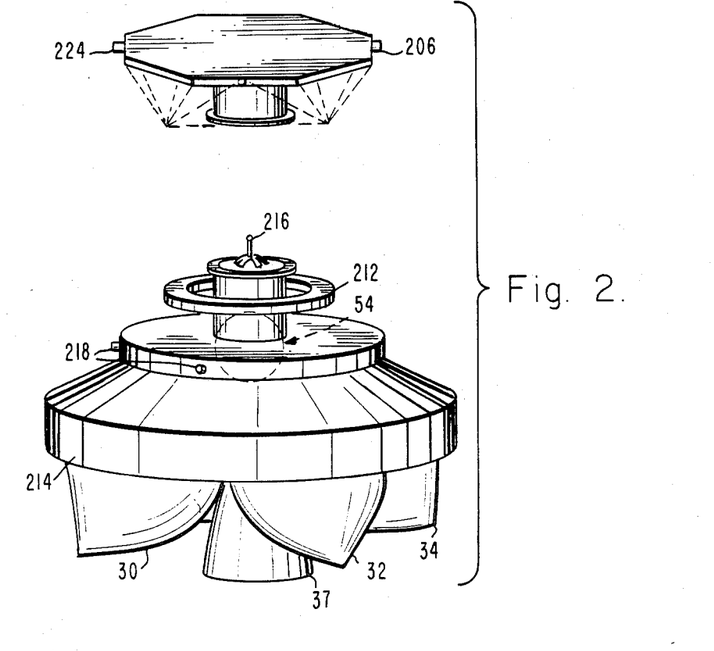
FIG. 2 is an exploded view of the booster stage and an interstage structure of FIG. 1.

With reference to FIGS. 1–2, a spacecraft (200) comprises a payload (202), a reusable engine stage (204), and an interstage structure (206) which connects the engine stage (204) to the payload (202). In accordance with the invention, the engine stage (204) includes a propulsion motor (37) fed by fuel from relatively lightweight tanks such as the tanks (30, 32, 34) and a fourth tank not visible in the views of FIGS. 1–2.

As will be described below, the interstage structure (206) allows for a disconnection of the engine stage (204) from the payload (202) after the spacecraft (200) is inserted into a geosynchronous orbit. The interstage structure (206) is discarded, and the engine stage (204) undergoes a descent maneuver which returns the engine stage (204) to a parking orbit of a space shuttle (not shown) for recovery and return to earth.

As shown in FIGS. 1–2, the engine stage (204) includes a telemetry and command antenna (212) and a solar panel (214) which converts solar energy into electrical energy for powering electrical circuitry (not shown) coupled from the antenna (212). The electrical circuitry also provides for command and control function relating to the operation of the propulsion motor (37). The antenna (212) is located at the end of the stage (204) opposite the engine (37) to allow communication with the payload (200) and stage (204) throughout the mission.

A grapple fixture (216) is located on the front of the stage (204) for well-known interaction with the shuttle remote manipulator system for recovery of the stage (204) into the shuttle. Attachment fixtures (218) on the exterior of the stage (204) facilitate connection and disconnection of the spacecraft (200) to the space shuttle. The interstage structure (206) is also provided with attachment fixtures (224) to aid in securing the spacecraft (200) to the space shuttle via a cradle.

In operation, the spacecraft (200) is loaded on board a space shuttle and carried to a parking orbit above the earth. The spacecraft (200) is launched from the shuttle for insertion into the transfer orbit. The propulsion motor (37) burns propellant provided by the stage tanks to boost the spacecraft from the parking orbit and then the geosynchronous orbit into the transfer orbit. Thereupon, the interstage structure (206) is activated, in well-known fashion, by electronic signals of well-known electrical circuitry (not shown) carried by the engine stage (204) to disconnect the payload (202) from the stage (204). The interstage structure (206) is separated in turn from the stage and discarded. The engine stage (204), which has become separated from the payload (202), is reactivated by signals from the foregoing electrical circuitry to maneuver into a descent trajectory which brings the engine stage (204) back to the parking orbit of the shuttle. The engine stage (204) is then recovered by the shuttle to be returned to earth for future use in the launching of future payloads.

In the foregoing description of the operation, mention has been made of the maneuvering of the spacecraft (200), the payload (202), and the reusable engine stage (204) in various trajectories and orbits in order to accomplish the purposes of the invention. These trajectories and orbits will now be further described with reference to FIGS. 3–4.

Figure 3:
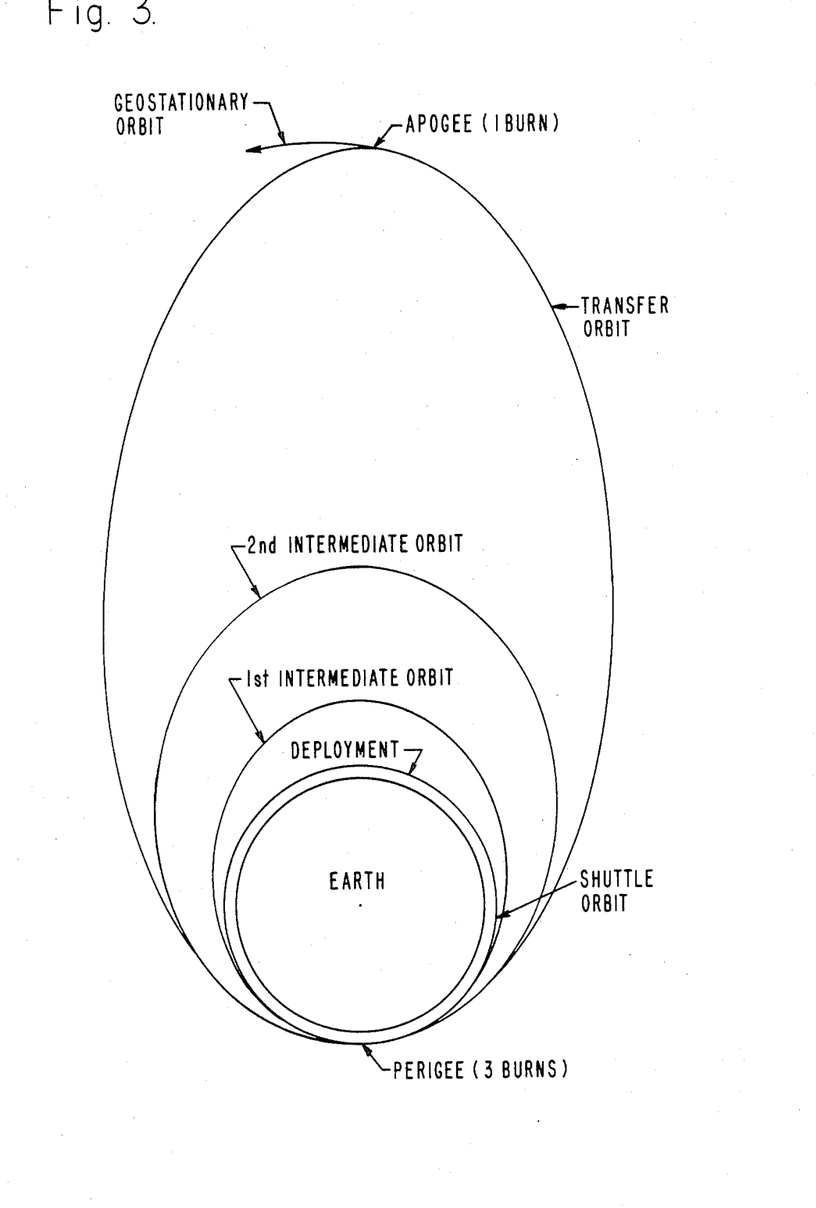
FIG. 3 shows a sequence of trajectories during ascent of the spacecraft to a geosynchronous orbit.

FIG. 3 illustrates typical orbit maneuvers required for injecting the payload (202) into a geostationary orbit. After ejection from the shuttle, the spacecraft (200) is rotated about its longitudinal axis providing a spin-up to approximately 15 RPM (revolutions per minute). There follows a half orbit (45 minutes) drift at the end of which the first burn of the main engine occurs, actuated by a timer (not shown) for imparting a velocity increment of 2300 ft/sec, the acceleration of the spacecraft to the foregoing velocity being terminated by a signal from a well-known velocity meter (not shown).

The new orbit has a period of about two hours. After one orbit, a second main engine burn is inaugurated by the timer at perigee and terminated by the velocity meter at 2900 ft/sec, this increasing the orbit period to three hours and forty minutes. After completion of one revolution in this new orbit, a third burn is initiated by command of the timer and has a velocity increment of 2800 ft/sec, this latter burn being terminated by the velocity meter. This third burn achieves geosynchronous transfer orbit, which orbit has a ten hour and thirty-three minute period.

Reorientation for the apogee maneuver is accomplished by radio command during the first transfer orbit, and apogee firing start is commanded by radio command at the optimum time, namely, at a second apogee of the transfer orbit thereby propelling the spacecraft (202) into the geostationary orbit above the earth. The apogee burn imparts a velocity increment of 5800 ft/sec to achieve the desired orbit. The total elapsed time from shuttle deployment is twenty-two hours and fifteen minutes.

Prior to the payload (202) separation from the stage (204) after injection of the spacecraft (200) into geosynchronous orbit, the stage (204) with payload (202) attached may be despun. After separation the stage (204) is spun up again to 15 RPM. The separation is accomplished in dual fashion wherein the payload (202) first separates from the interstage structure (206), the structure (206) then separating from the stage (204). The stage (204) is then prepared for its return voyage to the shuttle. The first step in the return voyage is to reorient the stage (204) approximately 15° in preparation for a descent maneuver commencing 13 hours after apogee injection. The timing is chosen to align the node of the stage (204) with that of the shuttle. In the descent maneuver, from geosynchronous orbit shown in FIG. 4, a velocity increment of 5800 ft/sec is started by radio command and is terminated by the velocity meter.

Figure 4:
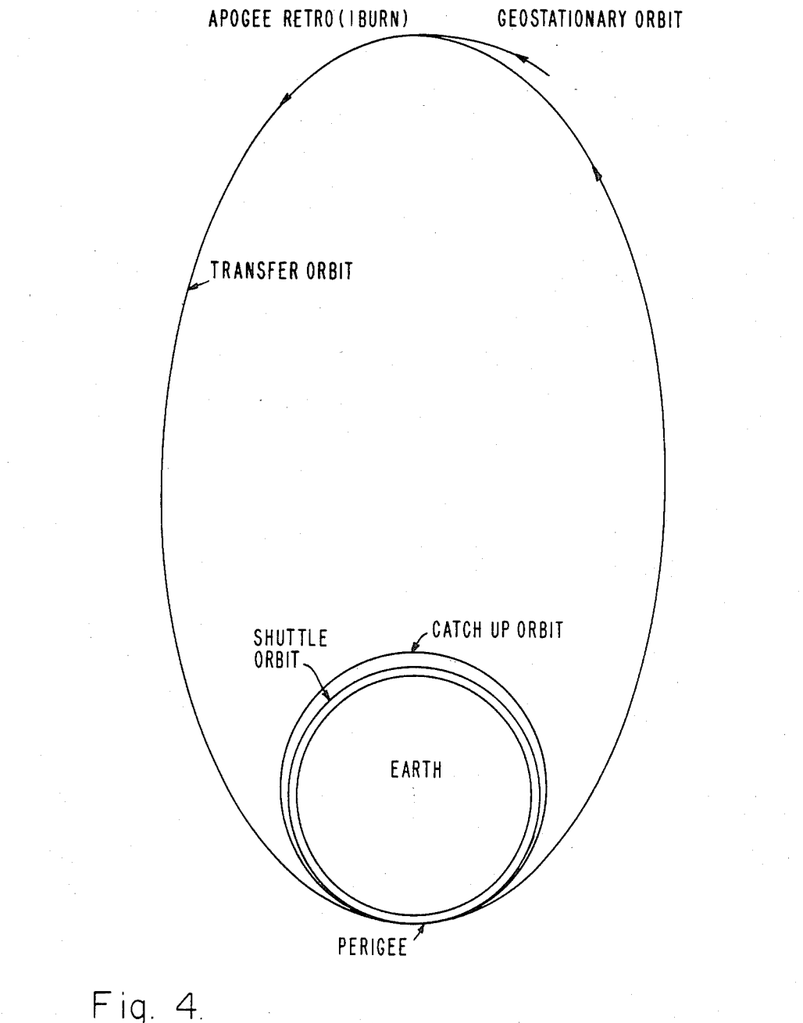
FIG. 4 shows a trajectory during a descent maneuver of a recoverable stage after separation from a payload.

The stage (204) is now in the ten hour and thirty-three minute transfer orbit with a perigee at the shuttle orbit altitude. The stage (204) is reoriented during this orbit via radio command and control in preparation for the application of the perigee velocity increment, which increment occurs at the perigee. The perigee burn is sized to create a new orbit of a slightly longer period than that of the shuttle, so that the shuttle can catch up with the stage (204).

The final maneuver is a synchronizing maneuver, performed by radio command. The entire mission up to the shuttle catch-up phase lasts about fifty-two hours, allowing twenty hours for touch-up maneuvers and despin during the catch-up to complete the recovery within three days of deployment.

The final stages of the rendezvous are completed by the shuttle crew, using first optical and then radar tracking to home in on the stage. When the stage is within range of a remote manipulating system (not shown) of the shuttle, an arm thereof is visually guided by an astronaut to attach itself to the stage (204) at the grapple fixture (216) thereof, and then return the stage (204) to the cargo bay of the shuttle. The foregoing description is typical of an exemplary geostationary orbit two-way mission. Other mission profiles, of course, are possible. Planetary missions may require variations in the procedure, for example, a fast reorientation after payload injection, but the equipment disclosed above will accomplish the requisite tasks for such planetary missions.

A significant feature of the present invention which enables efficient operation of spacecraft engines and, more particularly, the engine (37) of the separable booster stage (204) in a spacecraft so equipped, is the employment of the bipropellant delivery system which introduces adjustable pressures within the stage tanks to compensate for inaccuracies in bipropellant flow rates. Such inaccuracies develop because of variations in the vapor pressures and propellant pressure heads within the stage tanks during operation of the engine (37). The bipropellant delivery system of the invention provides a novel method for making pressure adjustments between engine burns in a sequence of such burns to insure efficient burning and the avoidance of excess bipropellant in the stage tanks at the end of a sequence of burns. Since the weight of such excess bipropellant militates against success of a spacecraft mission, this feature of the invention greatly enhances the chances of a successful mission. This feature will now be described with reference to FIGS. 5–7.

Figures 5, 6:
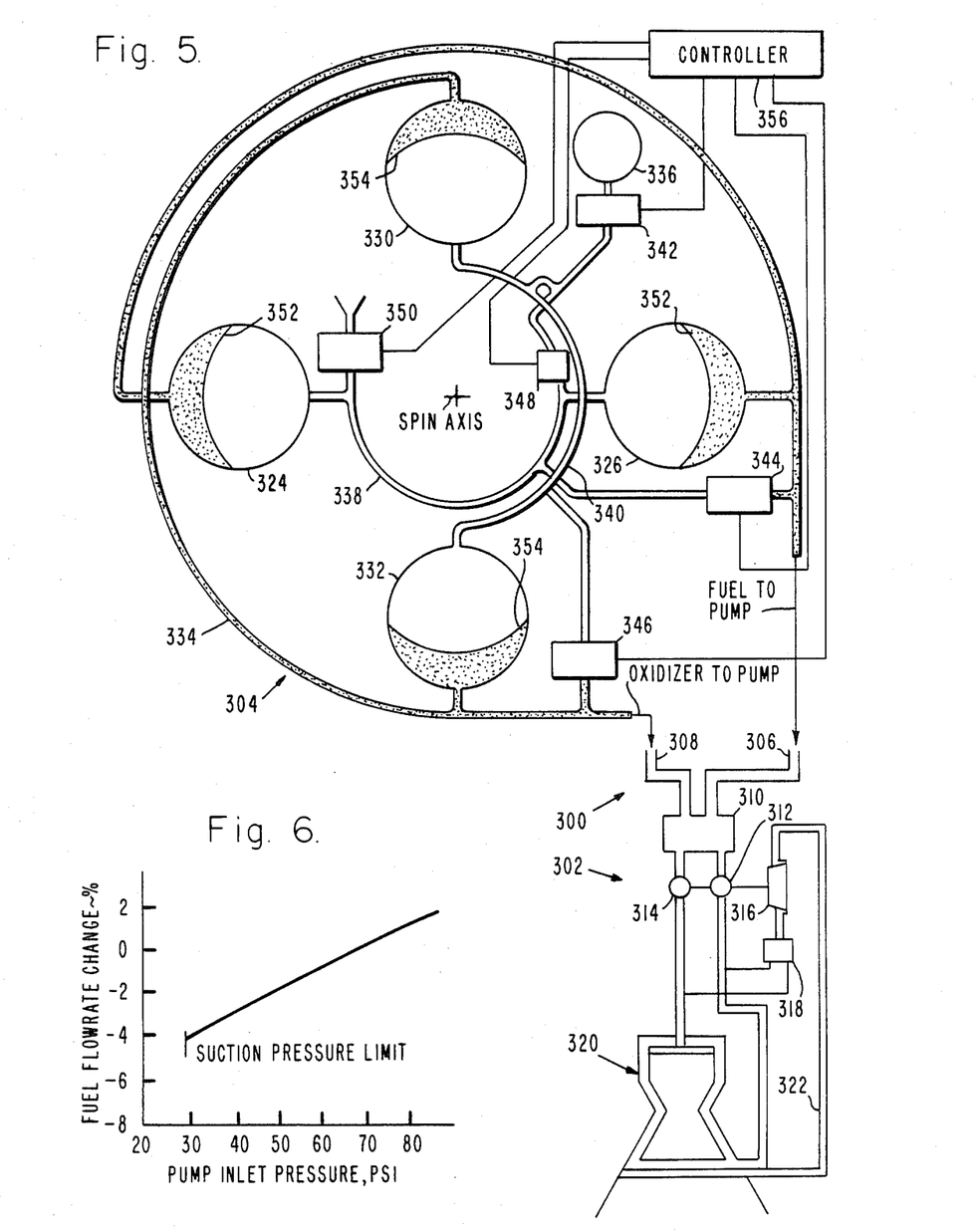
FIG. 5 is a diagrammatic view of a spacecraft engine and of a bipropellant delivery system of the invention for applying fuel and oxidizer to a spacecraft engine, the figure further showing tanks and controls of propellant utilization by a pressurant gas manifold and valves for regulation of the pressurant gas.
FIG. 6 is a graph illustrating dependency of fuel flow rates on inlet pressure from storage tanks to the pumps of FIG. 5.

FIG. 5 shows a propulsion system (300) incorporating the invention for driving a rocket stage of a spacecraft. The system (300), however, may also be used for driving a spacecraft which does not have staged engines. The system 300 includes a rocket engine (302) and a bipropellant delivery system (304) which supplies fuel and oxidizer via conduits (306, 308), respectively, to the engine (302). The fuel and oxidizer are the two constituents which make up the bipropellant. The engine (302) comprises a valve (310), pumps (312, 314) for pumping fuel and oxidizer, a turbine (316) which drives the pumps (312, 314), a gas generator (318) and a thrust chamber (320). Gas emitted by the generator (318) propels the turbine (316), and spent gases from the turbine (316) are conducted via an exhaust duct (322) to the mouth of the thrust chamber (320) for diposal of the spent gases. The thrust chamber (320) is cooled by the fuel applied by the pump (312) prior to the combination of the fuel and the oxidizer at the chamber (320). Upon combination of the fuel and oxidizer, the fuel burns to provide the thrust which propels the spacecraft. Operation of the valve (310) and the pumps (312, 314) for establishing rates of flow for the fuel and the oxidizer is accomplished in a well-known fashion. In particular, these elements are operated by well-known timing circuitry (not shown) which initiate and terminate a burn of the engine (302) at prescribed instants of time so as to accomplish desired trajectories in a spacecraft mission.

The bipropellant delivery system (304) is constructed with symmetry about a spin axis of the spacecraft, and comprises two fuel tanks (324, 326) which are located opposite each other on a diameter passing through the spin axis. A liquid manifold (328) connects with the two tanks (324, 326) for conduction of liquid fuel therefrom to the conduit (306), and via the conduit (306) to the valve (310). The delivery system (304) further comprises two oxidizer tanks (330, 332) which are connected by a liquid manifold (334) for the conduction of liquid oxidizer to the conduit (308), and via the conduit (308) to the valve (310). The oxidizer tanks (330, 332) also are positioned opposite each other on a diameter passing through the spin axis.

Also included within the delivery system (304) is a pressurant gas tank (336), a gas manifold (338) for conducting pressurant gas to the fuel tanks (324, 326), and a gas manifold (340) for conducting pressurant gas to the oxidizer tanks (330, 332). A regulator (342) couples the pressurant gas tank (336) to the gas manifolds (338, 340). Two differential pressure sensors (344, 346) are provided between the respective liquid and gas manifolds for sensing the differential pressure between their respective two gas manifolds and two liquid manifolds. The sensor (344) connects between the liquid manifold (328) and the gas manifold (338) which connect with the fuel tanks (324, 326). The sensor (346) connects between the liquid manifold (334) and the manifold (340) which are connected to the gas oxidizer tanks (330, 332).

Two valves (348, 350) are inserted into the gas manifold (338) for regulating gas pressure therein, the valve (348) serving as an inlet valve and the valve (350) serving as an exhaust valve. Opening of the valve (348) tends to increase pressure in the gas manifold (338), while an opening in the valve (350) tends to reduce pressure in the manifold (338). It is noted that the two pressurant gas manifolds (338, 340) are joined together at the outlet of the regulator (342). Thereby, operation of the valves (348, 350) permits different pressures to be maintained in the two pressurant gas manifolds (338, 340).

The fuel tanks (324, 326) are shown partially filled with fuel (352). Similarly, the oxidizer tanks (330, 332) are shown partially filled with oxidizer (354). Due to the spinning of the spacecraft, the fuel (352) and the oxidizer (354) are forced outwardly away from the spin axis. The regulator (342), the sensors (344, 346), and the valves (348, 350) are electrically connected to a controller (356) which applies signals to these elements for the regulation of the delivery of fuel and oxidizer as will be described hereinafter with reference to FIG. 7.

In operation, the engine (302) has the form of a turbopump-fed rocket engine employing a spinning propellant storage arrangement. The method of the invention assures that the fuel and the oxidizer are consumed in the correct proportions for simultaneous depletion of the stored fuel and oxidizer in their respective tanks. The invention employs measurements of the amount of fuel and oxidizer present between rocket engine burns in a multi-burn mission to adjust the relative flow rates between the fuel and the oxidizer for each succeeding burn as required to provide for the desired ratio in the utilization of the bipropellant constituents. This results in an increase in the effectiveness of the rocket engine, and is substantially easier to implement than a control of flow rates during an actual burn.

The oxidizer, typically nitrogen tetroxide, and fuel, typically mono-methyl hydrazine, are introduced into the pumps (314, 312) via the valve (310) at low pressure from the respective tanks (330, 332 and 324, 326). The oxidizer and fuel are pumped to a relatively high pressure by the pumps (314, 312), these pumps being driven by the turbine (316) in response to hot gas applied by the generator (318). The bipropellant (fuel and oxidizer) then are introduced into the thrust chamber (320) wherein combustion takes place. The fuel first flows through the outer walls of the chamber to cool the walls of the chamber and, thereafter, is burned in the presence of the oxidizer within the chamber (320) to produce the desired engine thrust.

The relative flow rates of the bipropellant constituents is determined primarily by the design of the pumps (312, 314), and upon the pressures in the tanks (324, 326, 330, 332). The dependence of fuel flow rate on pressure within the tanks (324, 326) is shown in the exemplary graph of FIG. 6. The dependence of fuel flow rate on tank pressure, as set forth in FIG. 6, is exploited in the present invention so as to adjust the fuel flow rate in accordance with the amounts of fuel and oxidizer remaining in their respective tanks upon the conclusion of each burn by the rocket engine (302).

In the operation of the delivery system (304), the system is pressurized by a gas, typically nitrogen or helium, stored at relatively high pressure in the tank (336), and delivery through the pressure regulator (342). This arrangement provides the desired bipropellant constituent tank pressure. The differential pressure sensors (344, 346), respectively for fuel and oxidizer element measurements, measure the amounts of the respective bipropellant constituents in their respective tanks. This permits computation of the masses of the fuel and oxidizer by the controller (356).

The pressure of the fuel can be adjusted by operation of the inlet valve (348) and the exhaust valve (350). The fuel pressure is lowered by shutting the inlet valve (348) and opening the exhaust valve (350); and the pressure is increased by opening the inlet valve (348) and closing the exhaust valve (350). The fuel flow rate is adjusted for the next burn by adjusting the fuel pressure between burns. The interval of time between burns typically is long enough for measurement of the amounts of fuel and oxidizer within the repsective tanks and regulating the relative pressure within the respective tanks. The desired flow rate compensates for the ratio of the mass of the remaining oxidizer to the mass of the remaining fuel found at the conclusion of the previous burn in order to prevent surplus fuel or oxidizer after the final burn. It should be noted that slight variations in the mixture ratio of oxidizer and fuel will have negligible effect on the engine burn efficiency as compared to the payload mass delivery penalties incurred by not preventing surplus fuel or oxidizer after the final burn.

The gas calculations for correcting the rates of propellant utilization, and the calibration of the differential pressure sensors to achieve the high accuracy desired for a spacecraft mission can be done either aboard the spacecraft or stage carrying the rocket engine (302), or can be accomplished with ground-based computers employing telemetry and command for operation of the spacecraft.

The manifolds (338, 340) contact their respective tanks at sites facing the spin axis. The liquid manifolds (328, 334) contact their respective tanks at sites diametrically opposed to the points of connection of the tanks with the manifolds (338, 340). Due to the spinning of the spacecraft, the contents of the tanks, namely, the fuel (352) in the tanks (324, 326) and the oxidizer (354) in the tanks (330, 332), are directed outwardly towards the manifolds (328, 334) and away from the manifolds (338, 340). Thus, vapor within the partially filled tanks communicates with the gas of the gas manifolds (338, 340), while liquid contents of the tanks communicate with the liquid manifolds (328, 334). This configuration of the vapor and liquid matter within each of the tanks (324, 326, 330, 332) enables the pressurant gas of the tank (336) to provide a back pressure which urges the liquid fuel and liquid oxidizer towards their respective manifolds and into the engine (302).

The desired fuel flow rate for the next burn can be expressed as a set of three equations based on the following parameters:

$M_o$ is the initial oxidizer mass, $M_f$ is the initial fuel mass, $m_o$ is the last measured oxidizer mass, $m_f$ is the last measured fuel mass, $dm_o$ is the oxidizer mass to be used in the next burn, and $dm_f$ is the fuel mass to be used in next burn.

The first equation gives the desired ratio R of oxidizer mass to fuel mass, namely:

$$\frac{m_o - dm_o}{m_f - dm_f} = \frac{M_o}{M_f} = R \quad (1)$$

Measurements of fuel and oxidizer actually consumed may indicate a deviation from the desired ratio, expressed as an error $\epsilon$ given by:

$$\epsilon = \frac{m_o}{m_f} - R \quad (2)$$

Compensation for the error is accomplished in the next burn by use of adjusted, or corrected flow rates which are described mathematically by substituting equation (2) into equation (1) to give:

$$Rdm_f = dm_o - m_f\epsilon \quad (3)$$

Figure 7:
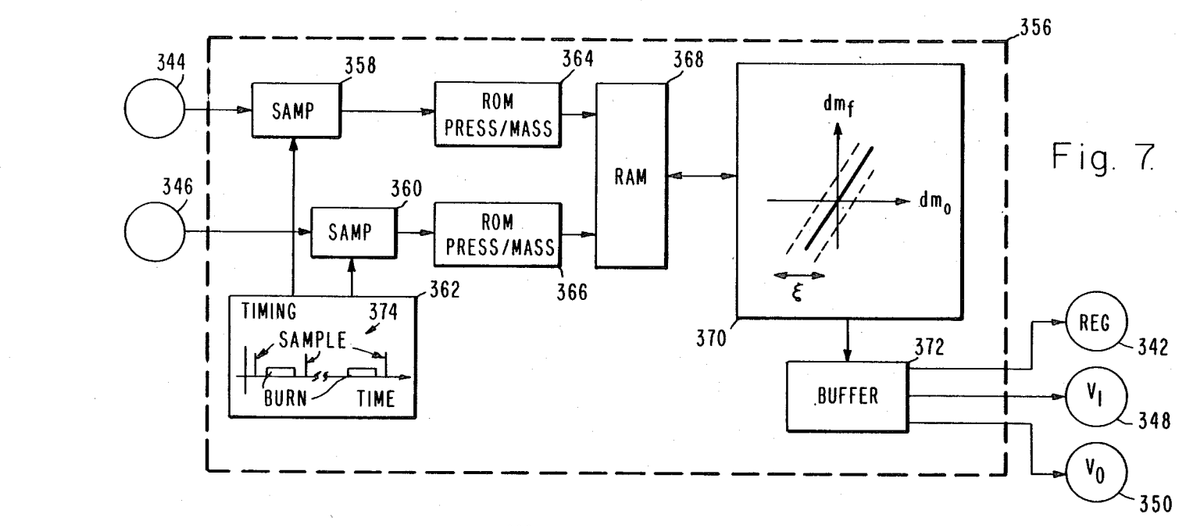
FIG. 7 is a block diagram of a controller of FIG. 5.

With reference also to FIG. 7, the controller (356) comprises two sampling units (358, 360), a timing unit (362), two memories (364, 366) which are constructed as read-only memories, a memory (368) constructed as a random-access memory, a computer (370), and an output buffer (372). The sampling unit (358) is connected to the differential fuel pressure sensor (344) for the measurement of fuel. The sampling unit (360) is coupled to the differential oxidizer pressure sensor (346) for the measurement of oxidizer. Both of the sampling units (358, 360) are strobed by timing signals of the timing unit (362).

As is shown by a graph (374), within the block of the timing unit (362), the sampling units (358, 360) are strobed after each burn of the rocket engine (302) (FIG. 5). The sampling units (358, 360) may also be strobed prior to the first burn to determine the initial quantities of fuel and oxidizer.

The sampling units (358, 360) output the differential pressure measurements to the memories (364, 366). There is a relationship between differential pressure and the mass of bipropellant constituent stored in a tank; this relationship depends in part on the shape of the tank. This relationship is established experimentally during the construction of the delivery system (304) and, thereafter, is stored in a corresponding one of the memories (364, 366). The relationship between pressure and mass for the fuel contained within the tanks (324, 326) is stored in the memory (364), and the relationship between pressure and mass for the oxidizer contained within the tanks (330, 332) is stored within the memory (366). The memories (364, 366) serve as converters for converting the measured pressure to the corresponding mass of fuel or oxidizer remaining in the respective tanks. The stored mass of fuel and the stored mass of oxidizer are provided by the memories (364, 366) to the memory (368) for use by the computer (370).

With reference also to the foregoing set of three equations (1), (2) and (3), it is noted that each of the parameters is expressed in terms of mass, this being either the mass of oxidizer or the mass of fuel. The values of mass of stored oxidizer and fuel, prior to a burn and subsequent to burn in a sequence of burns, are stored in the memory (368). The desired ratio of oxidizer mass to fuel mass may be inputted directly to the memory (368) by conventional means (not shown) or may be calculated by the computer (370) in accordance with equation (1) from the initial values of oxidizer mass and fuel mass. The error in the desired mass ratio is calculated by the computer (370) in accordance with equation (2). Finally, the relationship between oxidizer mass and fuel mass to be employed in the next burn is calculated by the computer (370) in accordance with equation (3).

The relationship expressed by equation (3) for oxidizer mass and fuel mass to be employed in the next burn is recognized as being linear, this relationship being depicted in a graph (376) presented within the block of the computer (370). The slope of the line in graph (376) is dependent on the desired ratio of oxidizer mass to fuel mass, while the line is displaced along the horizontal axis (oxidizer mass) by an amount dependent on the foregoing error. A suitable amount of oxidizer mass and fuel mass is readily determined from the foregoing relationship. The computer (370) then sends appropriate signals to the buffer (372) to command further openings and/or closings of the regulator (342), the inlet valve (348), and the outlet valve (350) to establish suitable back pressures in the tanks (324, 326, 330, 332) for correction of the flow rates of the fuel and the oxidizer to the engine (302). The buffer (372) may contain well-known storage units for storing the output values of the computer (370), and well-known line drivers for applying the command signals to the regulator (342), and the valves (348, 350). It is also noted that the opening and/or closing of regulators and valves for the control of pressure is employed in numerous industrial processes, and is sufficiently well-known so as not to require a detailed explanation herein. Thereby, the controller (356) operates the delivery system (304) to correct the flow rates of oxidizer and fuel in accordance with the invention for improved deployment of a spacecraft in its missions.

Figure 8:
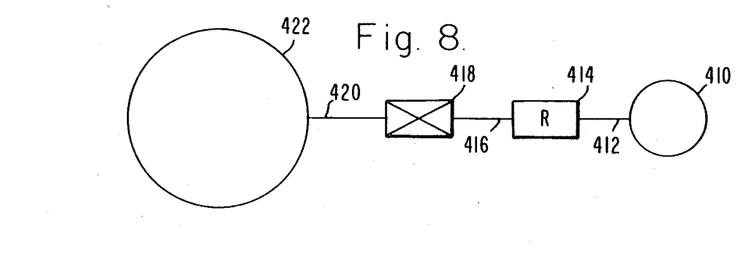
FIG. 8 is a diagrammatic view of an alternative system for pressurizing spacecraft bipropellant tanks.

Alternatively, pressure within the respective fuel tanks (324, 326) and the respective oxidizer tanks (330, 332) may be permitted to alternate between a substantially fixed regulated pressure and a variable blow-down pressure in order to achieve optimal bipropellant utilization. For example, as illustrated in FIG. 8, a source of high pressure pressurant gas (410), such as nitrogen or helium, may be provided which is pressurized at approximately 4000 psi. The pressurant gas is provided on line (412) to a regulator (414) which regulates the gas pressure on line (416) to approximately 70 psi. Valve (418) is connected via line (420) to a bipropellant tank (422) containing one of the bipropellant constituents. The valve (418) is interposed between lines (416, 420) such that, when open, the pressure within the bipropellant tank (420) is maintained at 70 psi.

It will be appreciated that adjustment of the rate of utilization of a bipropellant constituent within the tank (422) can be achieved by selectively opening or closing the valve (418). For example, after an engine burn is accomplished with the valve (418) closed, the pressure within the tank (422) will be below 70 psi due to the discharge of some bipropellant constituent from the tank (422) during the burn. Thus, after that rocket engine burn and before a next burn, a measurement of bipropellant mass within the tank (422) is made. Based upon this measurement, it is determined whether optimum bipropellant utilization will be achieved by opening the valve (418) and repressurizing the tank (422) to 70 psi prior to the next engine burn or by performing the next engine burn in the blow-down mode in which the pressure within the tank (422) at the start of the engine burn is below 70 psi. It will be appreciated that adjustment of pressure within other bipropellant tanks (not shown) in a similar manner also can be performed between engine burns such that the relative pressures within bipropellant tanks containing oxidizer and bipropellant tanks containing fuel is optimized for optimum utilization of both bipropellant constituents. Furthermore, the determination of whether to adjust a bipropellant tank pressure to 70 psi or to operate in a blow-down mode during a subsequent burn can be determined in a manner similar to that described above with respect to FIG. 7.

It will be understood that the above-described embodiments and methods are merely illustrative of many possible specific embodiments and methods which can represent the principles of the invention. Numerous and varied other arrangements can readily be devised in accordance with these principles without departing from the spirit and scope of the invention. Thus, the foregoing description is not intended to limit the invention which is defined by the appended claims in which:

What is claimed is:

1. A method for controlling the utilization of fluid bipropellant including two respective constituents contained separately in respective tanks aboard a spacecraft for consumption by a spacecraft rocket engine, comprising the steps of:

actuating the rocket engine;

during the actuation of the rocket engine, providing a flow of bipropellant constituents to the rocket engine in a first proportion;

after the actuation of the rocket engine, measuring the amount of at least one bipropellant constituent in at least one bipropellant tank containing the constituent;

adjusting a pressure level within at least one bipropellant tank relative to a pressure level within another bipropellant tank based upon the amount of said at least one bipropellant constituent in a bipropellant tank containing said at least one constituent;

after the measuring step, actuating the rocket engine; and during the actuation of the rocket engine after the measuring step, providing a flow of bipropellant constituents to the rocket engine in a second proportion based upon said adjusted pressure level within said at least one bipropellant tank relative to a pressure level within said another bipropellant tank.

2. The method of claim 1 wherein the step of measuring further comprises the steps of detecting the measured pressure level within the bipropellant tank; and determining the amount of said at least one bipropellant constituent within the bipropellant tank based upon the measured pressure level within the bipropellant tank.

3. The method of claim 1 wherein the step of measuring further comprises the steps of:
measuring the pressure level within at least one bipropellant tank containing said at least one bipropellant constituent;
measuring the pressure level within another bipropellant tank containing another bipropellant constituent;
determining the amount of said at least one bipropellant constituent in said at least one bipropellant tank based upon the measured pressure level within said at least one bipropellant tank; and
determining the amount of said another bipropellant constituent in said another bipropellant tank based upon the measured pressure level within said another bipropellant tank.

4. The method of claim 1 and further comprising the step of determining a second proportion of bipropellant constituents to be provided during a subsequent actuation of the rocket engine based upon the amount of said at least one bipropellant constituent in said at least one bipropellant tank.

5. A method for controlling the utilization of fluid bipropellant including two respective constituents contained separately in respective tanks aboard a spacecraft for consumption by a spacecraft rocket engine, comprising the steps of:
actuating the rocket engine;
during the actuation of the rocket engine, providing a flow of bipropellant constituents to the rocket engine in a first proportion;
after the actuation of the rocket engine, measuring a pressure level within at least one bipropellant tank containing a first bipropellant constituent;
after the actuation of the rocket engine, measuring a pressure level within another bipropellant tank containing a second bipropellant constituent;
determining the amount of said first bipropellant constituent in said at least one bipropellant tank based upon the measured pressure level within said at least one bipropellant tank;
determining the amount of said second bipropellant constituent in said another bipropellant tank based upon the measured pressure level within said another bipropellant tank;
determining a second proportion of bipropellant constituents to be provided to the rocket engine during a subsequent actuation of the rocket engine based upon the respective amounts of said first bipropellant constituent and said second bipropellant constituent in said respective at least one bipropellant tank and said another bipropellant tank;
adjusting a pressure level within said at least one bipropellant tank to achieve said second proportion during the subsequent actuation of the rocket engine;
after the adjusting step, actuating the rocket engine; and
during the actuation of the rocket engine and after the adjusting step, providing a flow of bipropellant constituents to the rocket engine in said second proportion.

* * * * *